(12) United States Patent
Kusnitz et al.

(10) Patent No.: US 12,304,233 B1
(45) Date of Patent: May 20, 2025

(54) CREATING MADE-TO-ORDER ITEMS WITH EMBELLISHMENTS

(71) Applicant: Sports Endeavors, LLC, Hillsborough, NC (US)

(72) Inventors: Jonathan Mark Kusnitz, Greensboro, NC (US); Gidon Tenne, Greensboro, NC (US); Peter Ferdinand Neurohr, Wake Forest, NC (US)

(73) Assignee: Sports Endeavors, LLC, Hillsborough, NC (US)

( * ) Notice: Subject to any disclaimer, the term of this patent is extended or adjusted under 35 U.S.C. 154(b) by 0 days.

(21) Appl. No.: 18/799,094

(22) Filed: Aug. 9, 2024

Related U.S. Application Data

(60) Provisional application No. 63/560,617, filed on Mar. 1, 2024.

(51) Int. Cl.
| | |
|---|---|
| *B44C 1/17* | (2006.01) |
| *D06C 23/00* | (2006.01) |
| *A41H 43/02* | (2006.01) |
| *A41H 43/04* | (2006.01) |
| *G06Q 30/0601* | (2023.01) |

(52) U.S. Cl.
CPC ............ *B44C 1/1712* (2013.01); *D06C 23/00* (2013.01); *A41H 43/0235* (2013.01); *A41H 43/04* (2013.01); *G06Q 30/0621* (2013.01)

(58) Field of Classification Search
CPC .............. B44C 1/1712; G06Q 30/0621; A41H 43/0235; A41H 43/0242; A41H 43/04
See application file for complete search history.

(56) References Cited

U.S. PATENT DOCUMENTS

| | | |
|---|---|---|
| 3,620,881 A | 11/1971 | Kannegiesser |
| 4,750,419 A | 6/1988 | Meredith |
| 5,020,430 A | 6/1991 | Harpold |
| 5,226,362 A | 7/1993 | Laccino |
| 5,335,594 A | 8/1994 | Karlyn |
| 5,526,742 A | 6/1996 | Petersen |
| 5,658,647 A | 8/1997 | Magill |

(Continued)

FOREIGN PATENT DOCUMENTS

| | | |
|---|---|---|
| CN | 110667239 A | 1/2020 |
| JP | 7067156 A | 9/2019 |

(Continued)

*Primary Examiner* — Scott W Dodds
(74) *Attorney, Agent, or Firm* — Kevin E Flynn; FLYNN IP LAW

(57) ABSTRACT

Binding a set of embellishments to an item as part of a made-to-order item request. Loading the item onto a lower platen so that the first portion of the item is positioned to receive the subset set of embellishments for placement on the first portion of the item. Advancing the lower platen and the tray to a pick & place station. Using a controlled matrix of vacuum ports to pick up a particular embellishment from a tray and position the particular embellishment on a target location for the particular embellishment on the lower platen that is loaded with the item. Repeating for each additional embellishment for the subset of embellishments for placement on the first portion of the item to be customized are all placed. Applying heat and pressure to bind the subset of embellishments for placement on the first portion of the item.

28 Claims, 8 Drawing Sheets

(56) References Cited

U.S. PATENT DOCUMENTS

| | | |
|---|---|---|
| 5,681,644 A | 10/1997 | Dressler |
| 5,970,874 A | 10/1999 | Bill |
| 6,053,101 A | 4/2000 | Hix |
| 6,192,794 B1 | 2/2001 | DeCruz |
| 8,838,482 B2 | 9/2014 | Schindler |
| 9,289,960 B2 | 3/2016 | Robinson |
| 9,573,332 B2 | 2/2017 | Robinson |
| 9,731,534 B2 | 8/2017 | Will |
| 9,781,307 B2 | 10/2017 | Xu |
| 10,137,590 B2 | 11/2018 | Harvill |
| 10,189,278 B1 | 1/2019 | Friedrich |
| 10,315,402 B2 | 6/2019 | Brook |
| 10,406,830 B2 | 9/2019 | Condello |
| 11,046,068 B2 | 6/2021 | Richards |
| 11,161,353 B1 * | 11/2021 | Thammasouk ........ B41J 3/4078 |
| 11,571,913 B2 | 2/2023 | Friedrich |
| 2006/0207448 A1 | 9/2006 | Fresener |
| 2013/0199385 A1 | 8/2013 | Robinson |
| 2013/0334757 A1 * | 12/2013 | Gerber .................. B65D 25/10 |
| | | 269/289 R |
| 2015/0029288 A1 * | 1/2015 | Will ..................... B41M 5/0358 |
| | | 347/213 |
| 2015/0101134 A1 * | 4/2015 | Manz ..................... A43D 95/00 |
| | | 12/142 R |
| 2016/0159125 A1 | 6/2016 | Leskanic |
| 2017/0165389 A1 | 6/2017 | Chao |
| 2019/0106838 A1 | 4/2019 | Hoffman, Jr. |
| 2020/0027147 A1 | 1/2020 | Dahlstrom |
| 2020/0230946 A1 | 7/2020 | Li |
| 2021/0364998 A1 | 11/2021 | George Boehm, Jr. |
| 2022/0118755 A1 | 4/2022 | Beaty |
| 2022/0288918 A1 | 9/2022 | Yardley |
| 2022/0305831 A1 | 9/2022 | Wegzyn |
| 2022/0363073 A1 | 11/2022 | Friedrich |
| 2023/0092254 A1 * | 3/2023 | Gogsig ................. C09J 175/04 |
| | | 12/52 |

FOREIGN PATENT DOCUMENTS

| | | |
|---|---|---|
| WO | 2021029003 A1 | 2/2021 |
| WO | 2023071916 A1 | 5/2023 |

* cited by examiner

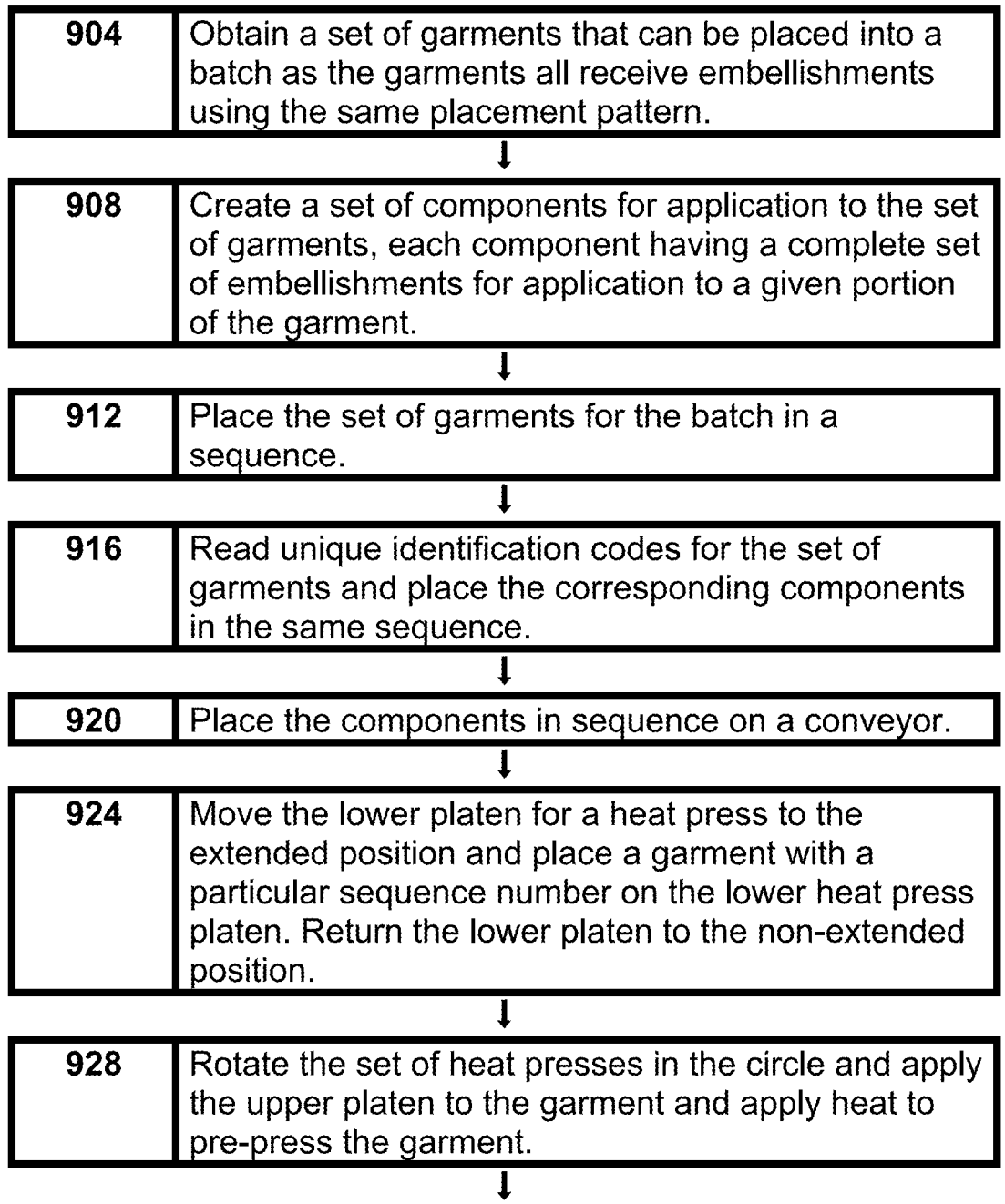

| FIG. 2A |
|---|
| FIG. 2B |

| 1004 | Obtain a tray with a computer readable identification marker. |
|---|---|

| 1008 | Associate the computer readable identification marker with a project work order. |
|---|---|

| 1012 | Place the set of embellishments on the tray with a gap surrounding each embellishment. |
|---|---|

| 1016 | Place the tray in queue for execution. |
|---|---|

| 1020 | Position the garment on a platen. |
|---|---|

| 1024 | Place the tray on the project carrier holding the lower platen. |
|---|---|

| 1028 | Confirm complete and correct set of embellishments are present. |
|---|---|

| 1032 | Advance the project carrier to pick & place station. |
|---|---|

| 1036 | Use subset of matrix of suction ports to pick up an embellishment. |
|---|---|

| 1040 | Use the robotic arm to place the vacuum matrix which has obtained the embellishment onto the platen. |
|---|---|

CREATING MADE-TO-ORDER ITEMS WITH EMBELLISHMENTS

BACKGROUND

This application claims the benefit of co-pending and commonly assigned U.S. Provisional Application No. 63/560,617 filed Mar. 1, 2024 for Creating Made-to-Order Items with Embellishments. The '617 application is incorporated by reference herein in its entirety.

FIELD OF THE DISCLOSURE

This disclosure relates generally to automation used in applying transfers to shirts or other apparel. Specifically, the disclosure is of particular use in MTO "made to order" garments which are customized rather than mass produced. In the case of jerseys worn by sports teams there are a number of items to be placed with precision on the jersey and the process will vary from jersey to jersey even when working within jerseys for the same team as the jersey size will vary and the jersey will typically have markings specific to a player such as the player's team number or the player's name. As the orders from members of the team to have a jersey prepared may come in asynchronously via online ordering, the jersey production process will normally jump from one team to another when doing a sequence of jerseys as the order for a team does not need to be queued for embellishment under this process. This process may be done using machine vision and pick and place robotics.

RELATED ART

U.S. Pat. No. 11,046,068, issued Jun. 29, 2021, for Direct-to-Transfer Printing System and Process, and Components and ASR System Therefore is a recent patent in this field. The '068 works with a carrier sheet that is slightly larger than the material to be transferred to the garment. The material to be transferred is called the embellishment in the '068 and may be a combination of player's name, player's team number, team logo, et cetera. The combination of the embellishment and the carrier sheet is called the component. The garment is placed on a bottom paten in a heat press. The component is positioned on the garment and then a top paten of the heat press is brought down to apply heat and pressure to cause transfer of the embellishment from the carrier sheet to the garment.

The '068 requires two distinct set of marks on the component in order to use the component in an automated process. The '068 needs an identification symbol such as a barcode, QR code, or the like. The '068 also requires the use of one or more separate registration symbols to allow the automated equipment to properly orient the component onto the apparel. The '068 expresses a preference that the components be consistent from one component to the next.

- Consistent on where the component is placed on the apparel.
- Consistent on the locations of the identification symbols on the component
- Consistent on the location of the registration symbols on the component.

The '068 relies on batch and sequence numbers that are either printed on the component or imposed by the use of storage slots in the automated storage and retrieval system ("ASR system") so a set of apparel for a batch to receive embellishments which are in a sequence can be used to place the corresponding components for that particular batch in the same sequence.

The '068 teaches that the garment/component pairs for a particular batch should all receive the same treatment. One of skill in the art understands that when making made-to-order items such as team jerseys that some jerseys only receive embellishments on the back or only on the front. Some jerseys receive embellishments on both the back and the front of the jersey.

Some jerseys may also include embellishments on one or both arms. The '068 teaches away from a process that can vary one garment to the next in the placement locations for the application of embellishments as the '068 wants the placement to be the same for all members of the batch. Thus, garments having a first placement pattern of only on the back can be in a first batch. Garments having a second placement pattern of back and front can be in a second batch. Garments having a third placement pattern of back and right shoulder can be in a third batch. Garments having a fourth placement pattern of back, front, right shoulder and left shoulder would need to be in a fourth batch.

The process set forth in the '068 has a set of heat presses with upper and lower platens. The '068 sometimes calls the lower platens "heat press pallets". The heat presses can be in one of several modes. Open with the upper platen above the lower platen. Open with the lower platen extended out so that the upper platen is not above the lower platen. Closed with the upper platen pressing against the lower platen to apply heat and pressure. The set of heat presses are in a loop which may be a circle or oval so that the lower platen may be extended radially outward from the center of the loop to allow access to the lower platen. The number of presses in the loop selected to allow adequate dwell time for the pre-pressing stage and the heat application stage.

FIG. 1A and FIG. 1B combine to form a flow chart for prior art process 900 as set forth in the '068 for adding embellishments to a garment.

Step 904 Obtain a set of garments that can be placed into a batch as the garments all receive embellishments using the same placement pattern.

Step 908 Create a set of components for application to the set of garments, each component having a complete set of embellishments for application to a given portion of the garment. Thus, the component may have the players name and players number so that the component once created is a unique item. The embellishments are captured in the component in the precise position relative to the other embellishments as needed for application of the set of embellishments to the garment.

Step 912 Place the set of garments for the batch in a sequence.

Step 916 Read unique identification codes for the set of garments and place the corresponding components in the same sequence.

Step 920 Place the components in sequence on a conveyor.

Step 924 Move the lower platen for a heat press to the extended position and place a garment with a particular sequence number on the lower heat press platen. Return the lower platen to the non-extended position.

Step 928 Rotate the set of heat presses in the circle and apply the upper platen to the garment and apply heat to pre-press the garment.

Step 932 Rotate the set of heat presses in the circle and end the pre-press step and lift the upper platen.

Step 936 Rotate the set of heat presses to a component placement station, extend the lower platen, and use a robot to place the component with the same sequence number as the garment onto the garment. One or more cameras use the registration marks on the component to adjust the placement of the component to a pre-defined placement on the lower platen.

Step 940 Return the lower platen to the non-extended position, rotate the set of heat presses to a press engage station. Lower the upper platen to apply heat and pressure to cause the embellishments to fuse with the garment.

Step 944 Rotate the set of heat presses to a press disengage station where the heat press process ends by lifting the upper platen.

Step 948 Rotate the set of heat presses to a garment unloading station, extend to lower platen and remove the embellished garment from the lower platen.

While the '068 teaches a process for applying heat transfers to made-to-order garments, the process has some limitations. The footprint of a loop of sixteen heat presses and the device to rotate the sixteen presses would be expensive. The need to cluster garments in batches with identical placement patterns (back only/front and back/back and shoulder/front & back & shoulder) imposes a burden. The need to add registration symbols to all of the components adds additional processing steps and potential faults.

Thus, there remains a need in the art for an alternative process for making made-to-order garments that receive heat transfer embellishments.

Vocabulary.

A and An.

In this application, and the claims that follow, the terms a, an, or the identification of a single thing should be read as at least one unless such an interpretation is impossible within the context of the entirety of the specification. For example, the use of the terms sole, only, or the phrase not more than one would indicate that a single item is intended.

Gne and Gnes.

To avoid the awkward he/she and his/her or the potentially confusing singular use of they and their, this application uses the Gender-Neutral Expression—gne, the possessive pronoun —gnes, reflexive pronoun—gneself and the object form—gnerm. Example—Gne looked for gnes notebook gneself as gnes friends would not help gnerm.

Or.

Unless explicit to the contrary, the word "or" should be interpreted as an inclusive or rather than an exclusive or. Thus, the default meaning of or should be the same as the more awkward and/or.

Set.

Unless explicit to the contrary, the word "set" should be interpreted as a group of one or more items.

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process, it is useful to note that a given parameter is substantially met. Examples may be substantially parallel, substantially perpendicular, substantially uniform, and substantially flat. In this context, substantially X means that for purposes of this industrial process it is X. Thus, something that may not be absolutely parallel but is for all practical purposes parallel, is substantially parallel. Likewise, mixed air that has substantially uniform temperature would have temperature deviations that were inconsequential for that industrial process.

As recognized in C. E. Equipment Co. v. United States, 13 U.S.P.Q.2d 1363, 1368 (Cl. Ct. 1989), the word "substantially" in patent claims gives rise to some definitional leeway —thus the word "substantially" may prevent avoidance of infringement by minor changes that do not affect the results sought to be accomplished.

Units.

Note that in order to provide focus on specific functions, the description below will reference various "units". In this context, a unit implies the required resources to perform a given set of functions. This may include a combination of electro-mechanical devices such as a microphone or a camera and the processing power to control the devices then manipulate the data obtained by the devices. In some instances, the functionality from several individually discussed units may be performed using physical components that are shared by several of the units discussed below.

Unless explicit to the contrary, the word "or" should be interpreted as an inclusive or rather than an exclusive or. Thus, the default meaning of or should be the same as the more awkward and/or.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

Aspects of this disclosure may be summarized as a process for binding a set of embellishments to an item to be customized as part of a made-to-order item request. The process including:

associating a tray with a specific made-to-order item request;

placing the set of embellishments for the made-to-order item request on the tray, the set of embellishments including a subset of embellishments for placement on a first portion of the item to be customized;

loading the item to be customized onto a lower platen so that the first portion of the item to be customized is positioned to receive the set of embellishments for placement on the first portion of the item to be customized;

advancing the lower platen and the tray to a pick & place station;

using a controlled matrix of vacuum ports to pick up a particular embellishment from the tray and position the particular embellishment on a target location for the particular embellishment on the lower platen that is loaded with the item to be customized;

repeating the step of using the controlled matrix of vacuum ports to pick up each additional embellishment from the tray and position each embellishment on an additional target location for each embellishment on the lower platen that is at least partially covered with the first portion of the item to be customized until the subset of embellishments for placement on the first portion of the item to be customized are all placed; and applying heat and pressure to bind the subset of embellishments for placement on the first portion of the item to be customized.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 1A and FIG. 1B combine to form a flow chart for prior art process 900 as set forth in the '068 for adding embellishments to a garment. Process 900 as shown in FIG. 1A and FIG. 1B includes steps 904 to 948. In accordance with the drawing standards of the United States Patent and Trademark Office, this flow chart is spread across two pages marked as FIG. 1A and FIG. 1B.

FIG. 2A and FIG. 2B combine to form an overview for the process 1000 for adding embellishments to a garment 200. Process 1000 as shown in FIG. 2A and FIG. 2B includes steps 1004-1088. In accordance with the drawing standards of the United States Patent and Trademark Office, this flow chart is spread across two pages marked as FIG. 2A and FIG. 2B.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1B:
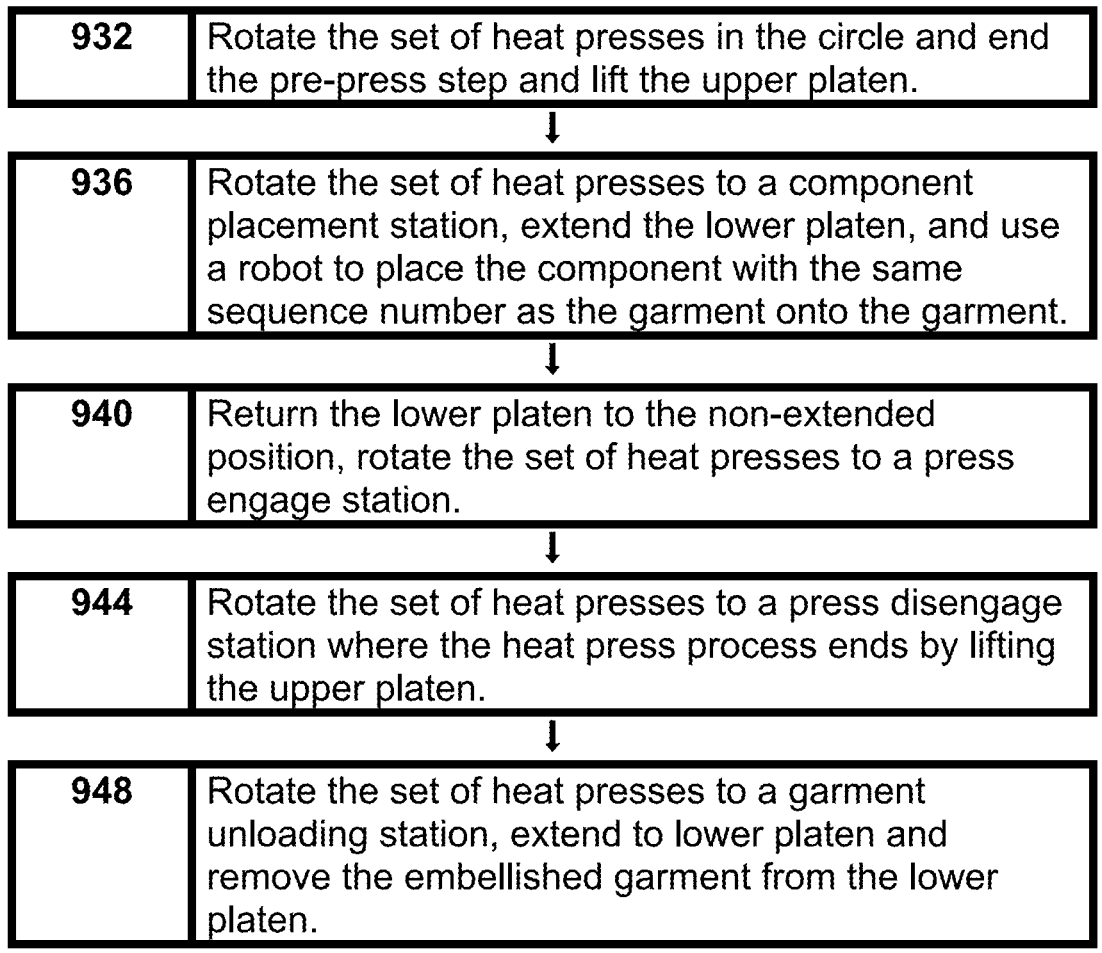
Figure 2B:
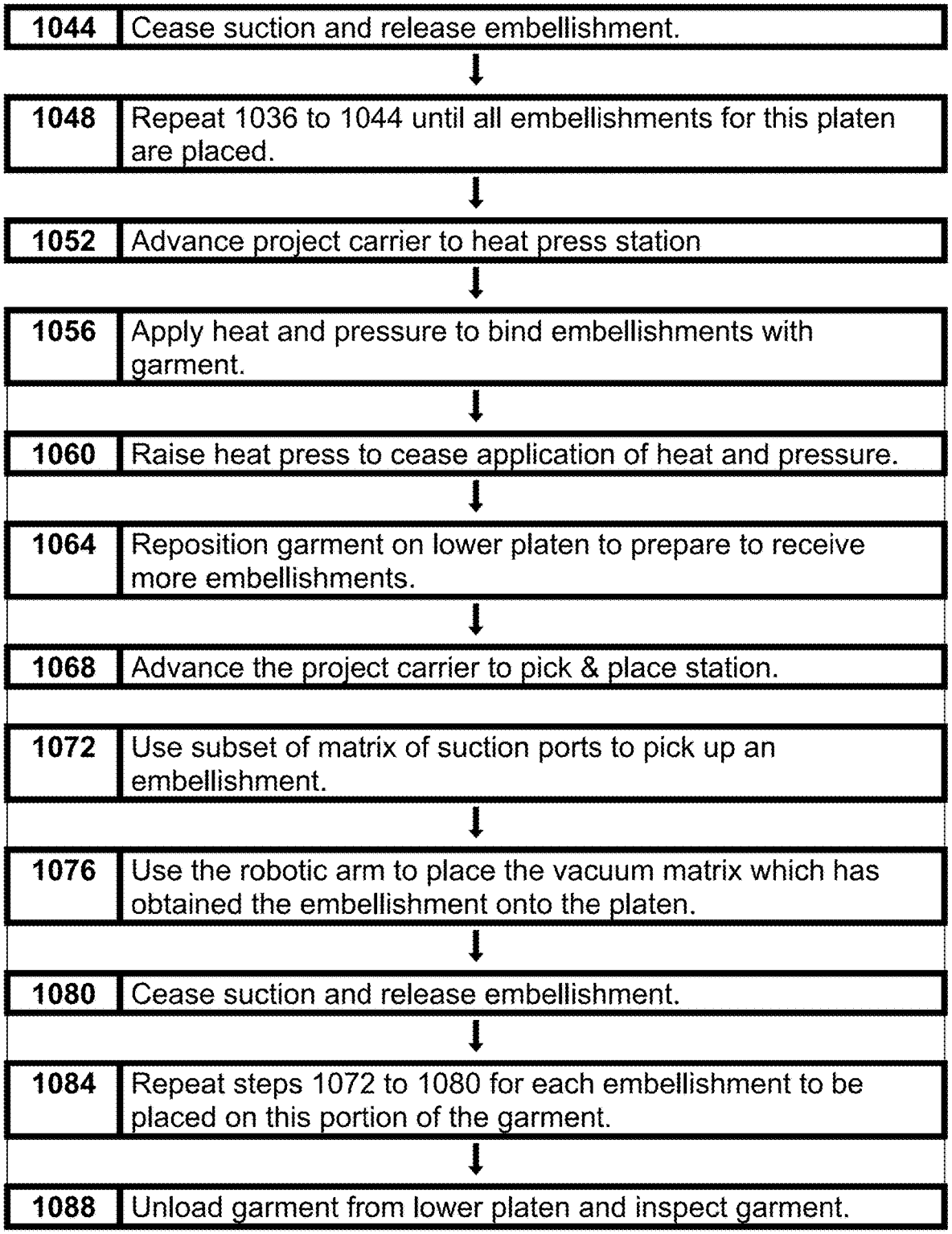

FIG. 2A and FIG. 2B combine to form an overview for the process 1000 for adding embellishments to a garment 200. For the benefit of the reader, this discussion of process will include element numbers that are introduced in a series of figures discussed after this discussion of the process.)

Process 1000 is part of a longer process to make a MTO garment. There are earlier steps of receiving the order, setting up a workorder for that garment, possibly as part of a larger order for that team or individual customer. There is an earlier set of steps to gather the embellishments for a particular workorder and the precise garment to receive the embellishments. These steps can be done a number of different ways and are beyond the scope of the present disclosure. But to provide context, these initial steps can be described at a high level as follows.

Step—A Obtain a made-to-order project request for a particular garment 200 to receive a set of embellishments in particular positions on the garment. When the garment 200 is a sport jersey, the embellishments may include:
A player number.
A player name.
A team name or logo.
A league name or logo.
A sponsor name or logo.

Beyond the identify of what is to be placed as an embellishment, there is the need to specify where each embellishment is going. A garment such as a team jersey may be broken down into a serious of embellishment placement locations. An example of the level of granularity is the following sample list:
upper left chest
upper right chest
middle center front
upper middle front
lower middle front
lower back
middle back
upper middle back and
upper back.

The precise definitions of these locations are not necessary in order to understand that there are a set of locations where a team logo might be placed. Different types of garments, may have different sets of placement locations.

Note that for an embellishment such as the number 7, there may be many different sizes for the number 7, many different colors, and many different fonts for the number 7 so the identification of embellishments is likely to specify a very specific version of the numbers or other items on the garment.

The selection of the garment 200 is apt to include manufacturer, style (such as length of sleeves or other features), color, and size. A particular garment may come in a wide range of sizes in order to accommodate very young players up through college athletes, or professionals that may wear XXXL or larger.

Step—B. Gather the garment 200 and the set of embellishments to be applied to the garment for this made to order project. For example, the embellishments may be gathered and placed in a folder with an ID tag that corresponds to a unique identifier for this made-to-order project. Separately, the garment for this project may be placed in queue for matching with the folder of embellishments.

The steps of relevance to the present disclosure that are captured in FIG. 2A and FIG. 2B for a process 1000 for adding embellishments to a garment 200 are as follows.

Step—1004 Obtain a tray 104 with a computer readable identification marker 108 on the tray 104. The identification marker 108 may be a bar code or QR code. The identification marker may be on the top side of the tray. The machine-readable code may be permanently affixed to the tray (integral) or the machine readable code may be on a tray liner mat that is placed on the tray. Other markers such as RFID tags may be used so that the system can recognize the unique identification of the tray and match that tray with a specific made to order project.

Optionally, the flat surface of the tray that receives the embellishments and the garments may have a background 112 that is a first color for some of the trays 104 and a second color for other trays 104. For example, the first color may be off-white, and the second color may be dark gray. Having at least two different colors for the background 112 allows a job with white embellishments to be placed on a dark gray tray so that there is ample contrast between the embellishments and the tray 104. Likewise, relatively dark embellishments may be placed on a tray 104 having the white background so that there is ample contrast between those dark embellishments and the tray. More than two tray background color choices are possible but there may be diminishing returns in having more than two choices. Having ample contrast may expedite the pick and place operation as the machine vision for the pick and place may identify the next embellishment to be moved more quickly. In a preferred embodiment, the system tells the operator what color tray to use but this could be left to the operator's discretion in other implementations. If tray liners are used, the tray liners may likewise have different colors for the same reason.

Step—1008 Associate the computer readable identification marker 108 on the tray 104 with a project work order for this garment 200.

Step—1012 Place the set of embellishments 300 on the tray 104 with a gap surrounding each embellishment so that there is a zone between one embellishment and all other embellishments. This gap facilitates the selective pick and place operation noted below.

Optionally, an image may be projected onto the tray 104 with a suggested pattern of the set of embellishments 300 so that the operator simply places each embellishment onto the image of the embellishment in order to obtain proper spacing. Strict adherence to the placement of embellishments onto the tray in accordance with a projected image would allow the pick & place operation to rely on that placement and go to pick up embellishments in reliance on that precise placement without using machine vision to confirm the actual location of the embellishments on the tray 104.

Place the garment onto the tray with a garment identification code 204 such as a bar code for the garment which may be read to ensure the proper garment for the MTO project is on the tray. The garment 200 may be placed on top of embellishments as the garment 200 will be removed before the pick and place step.

One of skill in the art will appreciate that failure to have a gap between embellishments may be surmountable but that having one embellishment partially or fully overlapping another embellishment is going to add complexity to the pick and place operation. This may be overcome by having a greater granularity in vacuum suction ports such as having an array of 10 by 10 ports instead of 4 by 4 so that much of an embellishment can be exposed to vacuum pressure while avoiding portions of the embellishment near the other overlapped embellishment. However, a preferred implementation avoids any overlap.

Step—1016 Place the tray 104 in queue for execution.

Step—1020 Remove the garment from the tray and position the garment on a platen to hold the garment in proper position for receiving embellishments on a first portion of the garment. For example, the players name and number may go on the back of a sport jersey. Subsequently, team or league logos may be applied to other portions of the garment.

In a preferred embodiment, an image of the existing short logo such as a Nike Swoosh symbol, an adidas logo, or another garment supplier logo which is already on the garment, may be projected onto the lower platen 510. The operator lines up the actual logo with the projected logo and aligns the neck hem with the top of the lower platen 510 to place the garment 200 in a reproduceable placement with respect to the lower platen. The pick and place operation can be executed to deliver the embellishment to a specific place on the lower platen which relies on the accurate placement of the garment on the lower platen. Optionally, an image of the embellishments to be placed on this portion of the garment may be projected onto the platen to help assist with proper placement of the garment on the platen. This image of where the embellishments will be placed may be particularly useful when the garment does not have a manufacture's logo, so that alignment guide is not available.

The lower platen 510 is on a project carrier 500 on a conveying line 566. The conveying line 566 differs from a conveying belt as items on the conveying line can be moved independently from other objects on the conveying line. Thus, objects can be stopped and worked upon while other objects are moving.

Those of skill in the art will appreciate that there are various vendors that provide standard parts made of 8020 aluminum for creating conveyor lines of any desired length. The particular choice of vendor and the particular width of the conveyor line is not material for purposes of this disclosure.

Those of skill in the art will appreciate that the garment 200 could be conveyed to the initial loading station without ever being placed on the tray. The use of the tray 104 to convey both the garment 200 and the set of embellishments 300 is just one process choice in implementing the teachings of the present disclosure.

Step—1024 Place the tray with the set of embellishments for that garment adjacent to the loaded lower platen so that the garment and the tray are on the same project carrier 500. Proximity of the tray to the lower platen reduces the time of travel of the robotic arm during pick and place operations.

Step—1028 Use machine vision to confirm that the tray 104 has the complete set of embellishments 300, and they are the specific embellishments required for this made to order project. If this step fails, then signal that this tray need to be reworked and do not apply any embellishments to the garment. Else proceed to step 1044.

Step—1032 Advance the project carrier 500 with the lower platen 510 and the tray 104 to a pick & place station. One of skill in the art will appreciate that the project carrier may be advanced to the pick & place station before checking to ensure that all the required embellishments are present on the tray, although throughput may be increased by doing this check at a station before the pick & place station.

Step—1036 Use a robotic arm to place a vacuum matrix with a set of individual suction ports over a portion of the tray before selectively applying suction to a subset of the set of individual suction ports on the vacuum matrix to pick up an embellishment without picking up other embellishments from the tray. For example, the digits for a player number may be picked up one at a time. Thus, a two-digit player number would require two distinct pick and place operations.

Optionally, player names are precut and placed on a backer so that only that one backer needs to be picked and placed as one elongated embellishment. This is not a requirement of the present disclosure.

The precise placement of the vacuum matrix and the activation of the subset of individual suction ports may be done using a combination of a known library of embellishment items so that the machine vision can know what embellishment item is being sought for the pick and place and the dimensions of the embellishment. The process may be expedited if a projected image of placement for the embellishment items on the tray is used to place the embellishment items on the tray so that the orientation and the likely location of the embellishment item is known to the machine vision system before the identification process starts.

Step—1040 Use the robotic arm to place the vacuum matrix which has obtained the embellishment onto a portion of the garment. One of skill in the art will appreciate that this placement step will require a high degree of accuracy so that the two numbers on a two-digit player number are placed so that the digits are aligned with one another. There should be consistency between jerseys too. One would want the team logo for two jerseys of the same size to be in substantially the same position. The precision will be a function of the way that the garment 200 was loaded on the lower platen 510 and the placement of the embellishment onto the lower platen 510. The placement of the garment onto the lower platen in an important step and the operator uses placement of the neck as one of the keys for accurate placement of the garment when the garment is a team jersey. To provide context, the Quality Control standards may require consistency in placement of an embellishment from one garment to the next to be within $\frac{1}{16}^{th}$ of an inch.

Step—1044 Cease the application of suction to the set of individual suction ports to release the embellishment on the portion of the garment.

Step—1048 Repeat steps 1036 to 1044 for each embellishment to be placed on this portion of the garment.

Step—1052 After the complete set of embellishments for this portion of this garment are placed, then advance the project carrier 500 with the lower platen 510 and the tray 104 to the heat press station.

Step—1056 Lower a heat press to apply pressure and heat to the garment 200 on the lower platen 510 to cause the embellishments loaded onto this portion of the garment 200 to bind with the garment 200.

Step—1060 After applying pressure and heat for a prescribed period, raising the heat press. Those of skill in the art will appreciate that the heat press for use in this sort of process may include a piece of silicon paper that sits between the rest of the heat press and the surface of the garment that has a set of embellishments. The heat press may be adapted to periodically advance the silicon paper to a take-up roll so that fresh silicon paper is placed in use. For example, the silicon paper may be refreshed in this way after three uses of the heat press.

Step—1064 For garments 200 that receive embellishments on more than one portion, the project carrier 500 with the lower platen 510 and the tray 104 may advance to a repositioning station where an operator repositions the garment 200 on the lower platen 510 so that embellishments may be applied to a different portion of the garment 200. For example, after receiving embellishments on the back of a garment 200, the garment 200 may be repositioned so that additional embellishments may be applied to the front of the garment 200.

Those of skill in the art will appreciate that a production line set up with two or more pick & place stations for applying embellishments to different portions of a garment may handle a garment that only receives embellishments on a single portion of the garment in a number of ways. One way is to simply leave the garment as originally positioned on the lower platen and simply proceed through subsequent stages of the production line without any activity until a final unloading station.

Step—1068 Advance the project carrier 500 with the lower platen 510 and the tray 104 to next the pick & place station.

Step—1072 Use a robotic arm to place a vacuum matrix over a portion of the tray before selectively applying suction to a set of individual suction ports on the vacuum matrix to pick up an embellishment without picking up other embellishments from the tray.

Step—1076 Use the robotic arm to place the vacuum matrix which has obtained the embellishment onto a portion of the garment 200.

Step—1080 Cease the application of suction to the set of individual suction ports to release the embellishment.

Step—1084 Repeat steps 1072 to 1080 for each embellishment to be placed on this portion of the garment 200.

Step—1088 After the embellishments have been applied, advance the project carrier 500 with the lower platen 510 and the tray 104 to an inspection station. Unloading the garment from the lower platen at this inspection station or to a subsequent unloading station where the garment 200 is removed from the lower platen 510.

Those of skill in the art will understand that the conveyor line is likely to have a return loop from the last station where the garment 200 is removed. The return loop will allow for the empty project carrier 500 to return to the beginning of the line where garments 200 are initially loaded onto the lower platen 510. One could take the project carriers 500 off a the end of a non-looped line and return them to the start of the line much like the personal item bins used at airport scanners, but this may be tedious as the project carriers 500 may be heavy and not stack upon one another.

The processing of the garment after unloading is beyond the scope of this disclosure but those of skill in the art will appreciate that the subsequent steps may include the garment leaving the last station with a card which may be a sticker that identifies the made-to-order project request for that particular garment 200. The garment 200 and any MTO project identification card may be placed into a container such as a bag, bin, or another tray and are moved to subsequent steps. The completed garment 200 may be routed to be processed for shipping. The completed garment 200 may be part of a larger order and may be place in storage pending completion of the other items that are needed to complete the order.

Those of skill in the art will appreciate that there may more than two portions or areas of a garment 200 that need to be positioned on a platen for application of embellishments. For example, a pair of tear-away warmup pants used by a basketball player during warmups may have a team logo in one position, a team name in a second position, and the player's number in a third location. It may be easier to place the warmup pants onto a platen several times in order to avoid having a lower platen 510 large enough to go the full length of the warmup pants. Thus, it is possible that a line may have more than two cycles of pick and place and application via heat and pressure.

Figure 3:
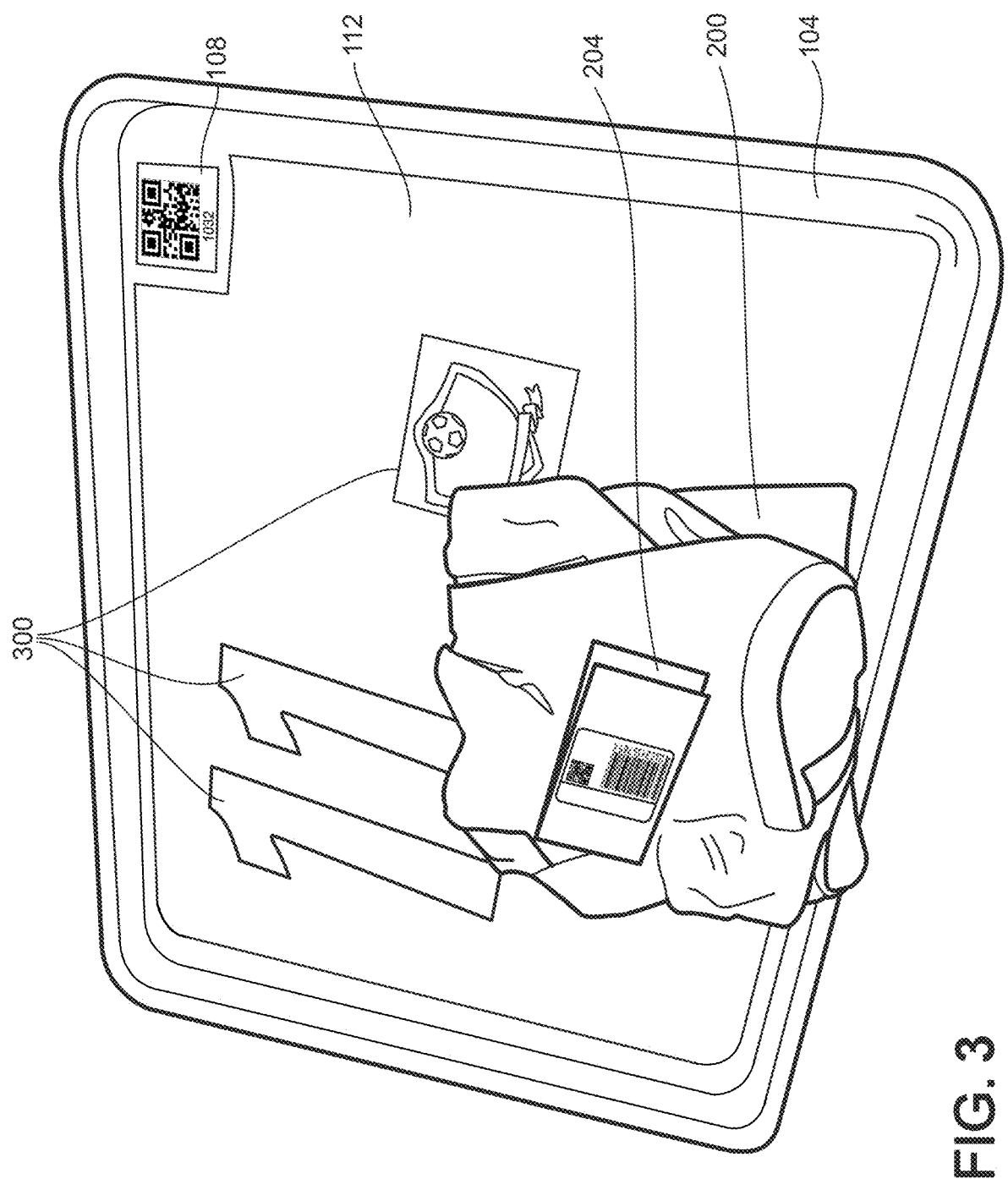
FIG. 3 shows a tray 104 with a computer readable identification marker 108 that is associated with the tray 104.

FIG. 3 shows a tray 104 with a computer readable identification marker 108 that is associated with the tray 104. The tray has a background 112 which may be selected from a set of at least two backgrounds in order to facilitate machine vision of the embellishments against the color of the background 112.

FIG. 3 includes a garment 200 which in this instance is a soccer jersey. The garment 200 has a garment identification code 204. This garment identification code 204 may be checked to ensure that the proper garment 200 has been obtained for this MTO project. Visible in FIG. 3 are three items in the set of embellishments 300. It is possible, that the garment 200 has been placed on top of another item in the set of embellishments 300 as the garment 200 will be removed from the tray 104 before the pick and place operation that moves the items in the set of embellishments 300.

Figure 4:
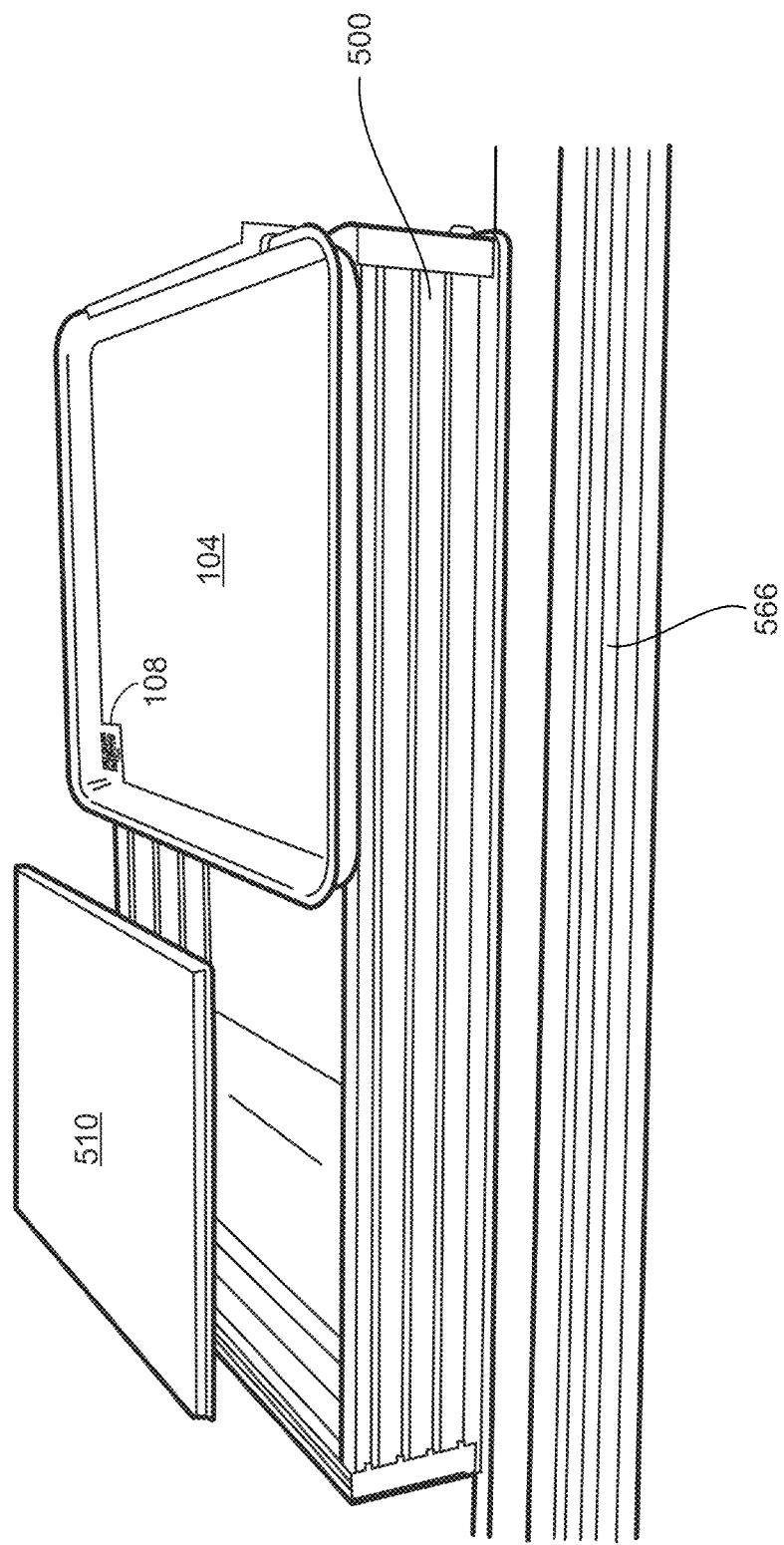
FIG. 4 shows a project carrier 500 with a lower platen 510 to receive a garment 200 positioned to receive embellishment.

FIG. 4 shows a project carrier 500 with a lower platen 510 to receive a garment 200 positioned to receive embellishment. The project carrier 500 is controllably advanced via a conveying line 566. The lower platen 510 is shown here without the cover which is much like an ironing board cover that provides a heat resistant surface with a small layer of cushioning under the cover to allow the heat press to press downward on the garment 200 and embellishments. After the embellishments are moved from the tray 104 to the garment 200, a heat press is lowered to apply heat and pressure to the embellishments in order to bind the embellishments to that portion of the garment 200.

Suitable lower platens 510 to be mounted to project carrier 500 may be obtained from a heat press equipment vendor such as Stahls located in St. Clair Shores, Michigan. The lower platen 510 may be machined to be flat where the lower platen 510 attaches to the project carrier 500 so that the lower platen 510 is well suited withstand repeated cycles of applied pressure from the heat press.

Figure 5:
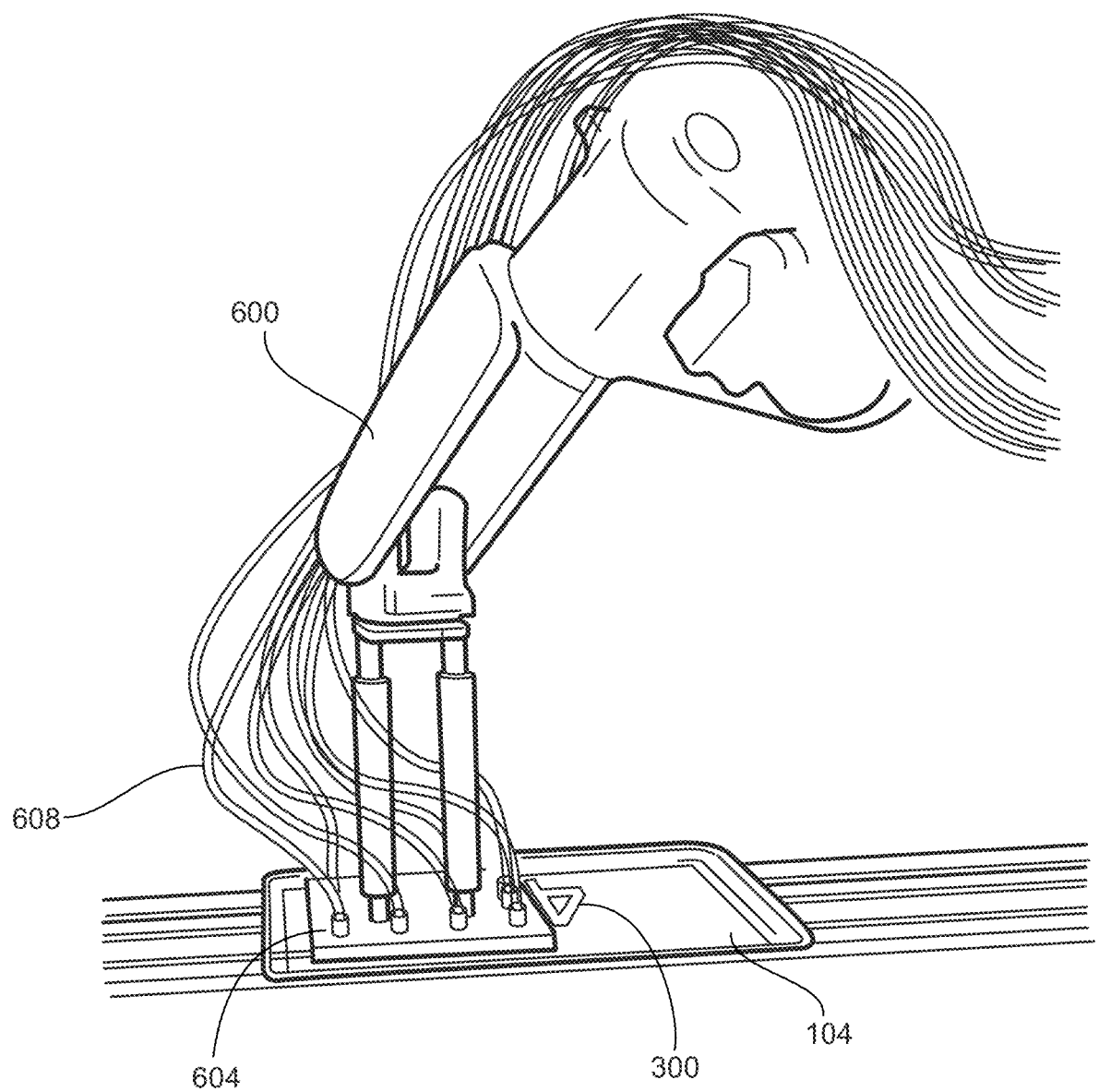
FIG. 5 shows a portion of a robotic pick and place device 600 with a distal pad 604 with an array of vacuum lines 608 that allow selective application of vacuum pressure to a subset of vacuum ports on the bottom side of the distal pad 604.

FIG. 5 shows a portion of a robotic pick and place device 600 with a distal pad 604 with an array of vacuum lines 608 that allow selective application of vacuum pressure to a subset of vacuum ports on the bottom side of the distal pad 604. The selective application of vacuum pressure used to pick up one embellishment of the set of embellishments 300 from the tray 104. In the robotic pick and place device 600 shown in FIG. 5, there is an array of four rows and four columns of vacuum lines.

The distal pad 604 with an array of vacuum lines 608 that allow selective application of vacuum pressure to a subset of vacuum ports on the bottom side of the distal pad 604 was custom made for this application. One of skill in the art can construct a similar array of vacuum ports that are exposed to suction via a manifold under computer control to create various suction patterns to pick up different embellishments after placing the distal pad 604 above the embellishment to be selected without applying vacuum to any ports of the distal pad 604 that are located over a different embellishment not being picked up during this pick & place cycle. A careful observer will note that this tray 104 is on a line with a parallel set of conveying lines-one for the trays 104 and one for a carrier for the lower paten.

Figure 6:
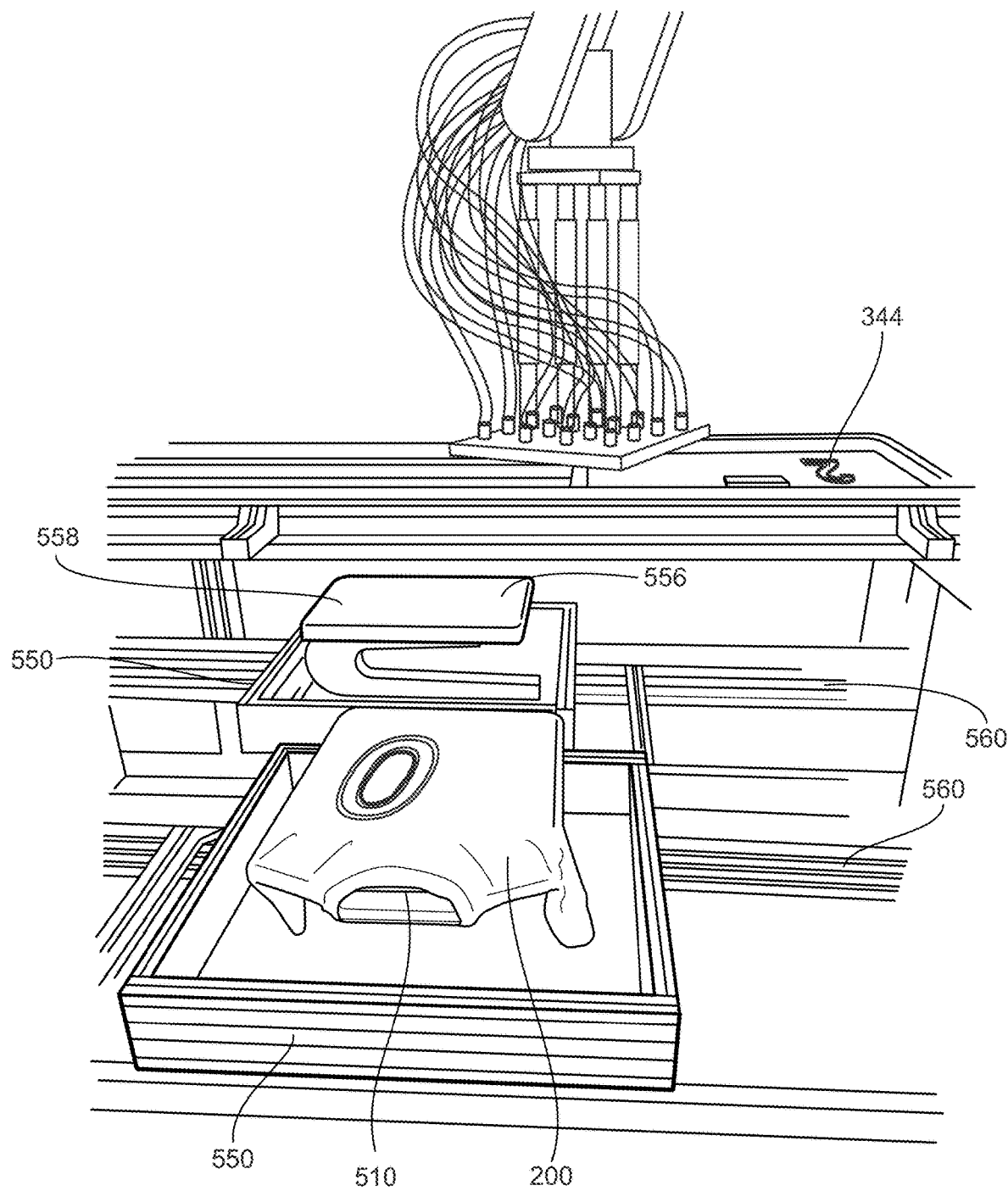
FIG. 6 shows an alternative to the project carrier 500.

FIG. 6 shows an alternative to the project carrier 500. In FIG. 6, there is a platen carrier 550 on a platen-only conveying line 560. In the foreground, there is a platen carrier 550 with a first lower platen 510 that is covered with a garment 200. Behind this, one can see a return loop of the platen-only conveying line 560 with another platen carrier 550 with an empty lower platen 558 with the platen cover 556 that cannot be seen in the first lower platen 554.

The trays 104, in contrast to platen carrier 550, do not return to the loading area via a return loop. The trays 104 are stacked and moved to the place where trays are loaded.

FIG. 6 also shows a portion of a robotic pick and place device 600 with a distal pad 604 with an array of vacuum lines 608 that allow selective application of vacuum pressure to a subset of vacuum ports on the bottom side of the distal pad 604. A first digit 340 of a two-digit player number has already been placed on the garment 200 and the pick and place device 600 is going back for the second digit 344 on the tray 104 associated with this MTO project.

ALTERNATIVES and VARIATIONS

Separate Conveyor Line for Trays.

While there are advantages in minimizing the distance between the tray and the platen by having the both the platen and the tray on a unitary project carrier, this is not a requirement for using the teachings of the present disclosure. An alternative is to have a platen carrier that carries the platen loaded with a garment on one conveying line and move the tray on a second nearby conveying line. The platen carrier and the tray may be selectively moved at the same times to go to the various processing stations.

Alternative to the Computer Readable Identification Marker on the Tray.

One of skill in the art will appreciate that instead of associating the computer readable identification marker 108 on the tray 104 with a project work order for this garment 200, that one could place a MTO project card on the tray 104 with a computer readable project ID. As noted above, the machine-readable code may be on a tray liner mat that is placed on the tray.

Item Does Not have to be a Garment.

The teachings of this disclosure have been conveyed in connection with a common use case—adding embellishments to a team jersey. However, the teachings of the present disclosure are not limited to sport jerseys or to garments. The teachings of the present disclosure apply to any item that can be placed flat on an appropriately sized lower platen and made of a material that can receive a heat transfer embellishment through the application of a heat press applying heat and pressure.

Non-limiting examples of non-garment items that may be embellished in this manner include carrying bags of various sizes. Carry bags are common in both sports and non-sport uses. Within sports there are specialized carry bags for baseball bats, hockey gear, lacrosse gear, soccer balls, duffle bags, and many other items. More generally, there may be a desire to embellish portions of a backpack, computer laptop bag, or other container made of a material that will accept a heat transfer. These non-sport items also fall within the broad concept of a carry bag. Non-carry bag items such as table cloths or napkins can be customized with MTO embellishments.

Return Loop Options.

While in some implementations the conveying line (560 or 566) including the return loop will exist in one plane a substantially constant distance above a floor, this is not required. Portions of the return loop may be above or even below a plane that contains the pick & place and heat transfer stations referenced above. For example, it may be prudent for reducing the footprint of this assembly process to have at least a portion of the return loop located directly underneath the outgoing portion of the conveying line (560 or 566).

An additional alternative would be to have a first process as set forth above that moves the project carrier 500 or platen carrier 550 in a first direction as the garment receives embellishments and then have a second set of equipment on the return loop so that a second garment receives a second set of embellishments as the project carrier 500 or platen carrier 550 returns back to the start of the first process.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A process for placing a set of at least two embellishments upon an item to be customized as part of a made-to-order item request, the process comprising:
    associating a unique identifier associated with a tray with a specific made-to-order item request;
    placing the set of at least two embellishments for the made-to-order item request on the tray;
    loading the item to be customized onto a lower platen so that a first portion of the item to be customized is positioned to receive at least one embellishment from the set of at least two embellishments;
    advancing the lower platen and the tray to a pick & place station;
    using a controlled matrix of vacuum ports to pick up a first embellishment from the tray and position the first embellishment on a first target location for the first embellishment on the lower platen that is loaded with the first portion of the item to be customized; and
    subsequently using the controlled matrix of vacuum ports to pick up a second embellishment from the tray and position the second embellishment on a second target location.

2. The process of claim 1 wherein the step of using the controlled matrix of vacuum ports to pick up the first embellishment from the tray and position the first embellishment on the first target location for the first embellishment on the lower platen is achieved based on a reliance on a precise placement of the first embellishment on the tray as the tray was loaded with embellishments placed on a set of images of the embellishments on the tray.

3. The process of claim 2 wherein the set of images of the embellishments on the tray are formed by a projection of images onto the tray.

4. The process of claim 1 wherein each embellishment from the set of embellishments is placed on the tray without partially overlapping a previously placed embellishment.

5. The process of claim 1 wherein the item to be customized as part of a made-to-order item request is a garment.

6. The process of claim 1 wherein the item to be customized as part of a made-to-order item request is not a garment.

7. The process of claim 6 wherein the item to be customized as part of a made-to-order item request is a carry bag.

8. The process of claim 1 wherein loading the item to be customized onto the lower platen is done by projecting an image of a manufacturer's logo onto the item and moving the item on the lower platen to position an actual manufacturer's logo directly underneath the image of the manufacturer's logo.

9. The process of claim 1 further comprising;
    repositioning the item on the lower platen so that a second portion of the item to be customized is positioned to receive a second subset of embellishments for placement on a second portion of the item to be customized that is part of the set of embellishments to the item to be customized;
    advancing the lower platen and the tray to a second pick & place station;
    using a second controlled matrix of vacuum ports to pick up a next embellishment from the tray and position the next embellishment on a target location for the next embellishment on the lower platen that is loaded with the repositioned item to be customized;
    repeating the step of using the second controlled matrix of vacuum ports to pick up each next embellishment from the tray and position each next embellishment on a target location for each next embellishment on the lower platen that is loaded with the item to be customized until all embellishments in the second subset of embellishments for placement on the second portion of the item to be customized are placed; and
    applying heat and pressure to bind all the embellishments placed on the second portion of the item to be customized.

10. The process of claim 9 wherein the first portion of the item is on a first side of the item and the second portion of the item is on a second side of the item, different than the first side of the item.

11. The process of claim 10 wherein the set of embellishments are placed on a front and a back of the item.

12. The process of claim 9 wherein the first portion of the item is on a first side of the item and the second portion of the item is on the first side of the item.

13. The process of claim 1 wherein the item is a sport jersey and the set of embellishments for the made-to-order item request include at least one set of numbers identifying a specific player on a sports team.

14. The process of claim 13 wherein the at least one set of numbers is a two-digit number.

15. The process of claim 13 wherein the at least one set of numbers is more than a two-digit number.

16. The process of claim 1 wherein associating the tray with the specific made-to-order item request uses a computer readable identification marker that is integral to the tray.

17. The process of claim 16 wherein the computer readable identification marker that is integral to the tray is a QR code.

18. The process of claim 16 wherein the computer readable identification marker that is integral to the tray is a bar code.

19. The process of claim 16 wherein the computer readable identification marker that is integral to the tray is an RFID tag.

20. The process of claim 1 wherein associating the tray with the specific made-to-order item request uses an ID tag on a card placed onto the tray for the specific made-to-order item request.

21. The process of claim 1 wherein associating the tray with the specific made-to-order item request uses a computer readable identification marker on a tray liner mat that is placed on the tray and is readable via machine vision.

22. The process of claim 1 wherein the lower platen and the tray are on a single project carrier which carries both the lower platen and the tray to the pick & place station.

23. The process of claim 22 further comprising conveying the single project carrier on a return loop from after a station used for unloading of the item with the single project carrier returning back to a start of the process for loading with another item to be customized.

24. The process of claim 1 wherein the lower platen is on a platen carrier which carries the lower platen to the pick & place station and the tray is not carried on the platen carrier.

25. The process of claim 24 further comprising conveying the lower platen on a return loop from after a station used for unloading of the item with the lower platen returning back to a start of the process for loading with another item to be customized.

26. The process of claim 1 wherein the first portion of the item to be customized receives the first embellishment and the second embellishment.

27. The process of claim 1 wherein the first portion of the item to be customized receives the first embellishment and the second embellishment is placed upon a second portion of the item to be customized after the first embellishment has been bound to the item.

28. The process of claim 27 wherein the first embellishment is bound to the item through application of heat and pressure.

* * * * *